(12) United States Patent
Lee

(10) Patent No.: US 9,205,866 B2
(45) Date of Patent: Dec. 8, 2015

(54) STEERING CONTROL APPARATUS AND METHOD

(71) Applicant: MANDO CORPORATION, Pyeongtaek-Si, Gyeonggi-do (KR)

(72) Inventor: Sung Gun Lee, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/308,615

(22) Filed: Jun. 18, 2014

(65) Prior Publication Data
US 2015/0066300 A1 Mar. 5, 2015

(30) Foreign Application Priority Data
Aug. 30, 2013 (KR) .................. 10-2013-0103860

(51) Int. Cl.
*B62D 6/00* (2006.01)
*B62D 5/06* (2006.01)
*G06F 7/70* (2006.01)
*B60T 8/24* (2006.01)
*B62D 15/02* (2006.01)

(52) U.S. Cl.
CPC .............. *B62D 6/003* (2013.01); *B62D 15/025* (2013.01)

(58) Field of Classification Search
USPC .................. 701/41, 70; 180/409; 303/140
See application file for complete search history.

(56) References Cited

U.S. PATENT DOCUMENTS

| 6,795,761 | B1 * | 9/2004 | Lee et al. ................. 701/41 |
| 2002/0052681 | A1 * | 5/2002 | Matsuno .................. 701/70 |
| 2002/0087247 | A1 * | 7/2002 | Tanaka et al. ............ 701/70 |
| 2003/0042790 | A1 * | 3/2003 | Amberkar .............. 303/140 |
| 2007/0106444 | A1 * | 5/2007 | Asano ..................... 701/70 |
| 2010/0222977 | A1 * | 9/2010 | Tan et al. ................. 701/70 |
| 2011/0257826 | A1 * | 10/2011 | Yu et al. .................. 701/29 |
| 2012/0109460 | A1 * | 5/2012 | Tokimasa et al. ........ 701/41 |
| 2012/0253630 | A1 * | 10/2012 | Handa et al. ............. 701/99 |
| 2012/0316733 | A1 * | 12/2012 | Futamura et al. ........ 701/42 |

* cited by examiner

*Primary Examiner* — Thomas G Black
*Assistant Examiner* — Tyler Paige
(74) *Attorney, Agent, or Firm* — McDermott Will & Emery LLP

(57) ABSTRACT

Disclosed are steering control apparatus and a steering control method which are capable of determining a turning state of a vehicle, and controlling a steering control signal so that the vehicle maintains a normal turning state, thereby improving safety of the vehicle.

5 Claims, 4 Drawing Sheets

STEERING CONTROL APPARATUS AND METHOD

CROSS-REFERENCE TO RELATED APPLICATION

This application claims the priority under 35 U.S.C. §119 (a) to Korean Patent Application Serial No. 10-2013-0103860, which was filed in the Korean Intellectual Property Office on Aug. 30, 2013, the entire content of which is hereby incorporated by reference.

BACKGROUND OF THE INVENTION

1. Field of the Invention

The present invention relates to a steering control apparatus and method.

2. Description of the Related Art

A steering control apparatus such as an electric power steering (EPS) has been widely employed in a vehicle because of several factors including spotlighting an environment-friendly aspect and increasing an importance of the fuel-economy of vehicle. Current research for the steering control apparatus has aimed at securing stability in high speed driving, and an automatic steering apparatus such as an active safety system.

A conventional steering control apparatus is an apparatus which aims to assist a steering force in consideration of factors including a velocity and an acceleration of a vehicle, a steering torque of a driver, and the like.

However, the conventional steering control apparatus has a disadvantage in that it fails to provide a suitable steering control signal when the vehicle turns. For example, in situations in which a steering angle is excessive or lacking, a frictional coefficient of a road decreases when the vehicle turns, and a driving force is increased in a rear wheel-driving vehicle, although an abnormal turning state (over-steering or under-steering) has a close relation with the steering control apparatus, the conventional method of controlling the steering apparatus fails to provide an improvement of the above-mentioned problems when the vehicle turns. Especially, a method of suitably controlling the steering apparatus is required because the abnormal turning state of the vehicle becomes a large factor in endangering a vehicle and a human-being when the vehicle turns in an abnormal turning state.

SUMMARY OF THE INVENTION

The present invention has been developed to solve the above-mentioned problem in the conventional art, and an aspect of the present invention is to provide a steering control apparatus, which is capable of determining a turning state, and appropriately controlling a steering control signal in order to allow the vehicle to maintain a normal turning state, thereby improving safety of the vehicle.

In accordance with an aspect of the present invention, a steering control apparatus is provided. The steering control apparatus includes: a determining unit which calculates the first Yaw rate value based on a steering angle measured by a torque sensor and compares the first Yaw rate value with the second Yaw rate value measured by the Yaw rate sensor, so as to determine a turning state of a vehicle according to a result of the comparison; and a controller which adjusts a control amount for a control disturbing an alignment of tires to return the vehicle to a normal turning state if it is determined that the vehicle is in an abnormal state.

In accordance with an aspect of the present invention, a steering control method is provided. The steering control method includes: calculating the first Yaw rate value based on a steering angle measured by a torque sensor and comparing the first Yaw rate value with the second Yaw rate value measured by the Yaw rate sensor, so as to determine a turning state of a vehicle according to a result of the comparison; and adjusting a control amount for a control disturbing an alignment of tires to return the vehicle to a normal turning state if it is determined that the vehicle is in an abnormal state.

As described above, according to the present invention, the steering control apparatus determines a turning state of the vehicle, and appropriately controls a steering control signal in order to allow the vehicle to maintain a normal turning state, thereby improving safety of the vehicle.

BRIEF DESCRIPTION OF DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

The present invention discloses a steering control apparatus and a steering control method, which are capable of securing a safe driving based on a turning state of a vehicle.

Hereinafter, the steering control method and the steering control apparatus for performing the method according to the embodiment of the present invention will be described with reference to the drawings.

Figure 1:
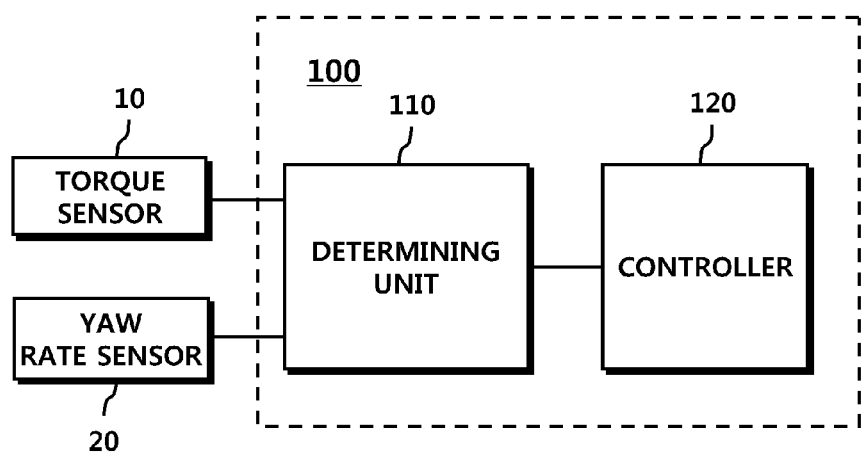
FIG. 1 is a block diagram illustrating a steering control apparatus according to an embodiment of the present invention.

FIG. 1 is a block diagram illustrating a steering control apparatus according to an embodiment of the present invention.

In FIG. 1, the steering control apparatus 100 according to the embodiment of the present invention may include a determining unit 110 which calculates the first Yaw rate value based on a steering angle measured by a torque sensor 10, compares the first Yaw rate value with the second Yaw rate value measured by the Yaw rate sensor 20, and determines a turning state of the vehicle according to a result of the comparison, and a controller 120 which controls a control amount to a control of hampering an alignment of tires so as to return the turning state of the vehicle to a normal state if it is determined that the turning state of the vehicle is abnormal.

The steering control apparatus 100 shown in FIG. 1 may be an electronic control unit (ECU) of the vehicle, of which the controller 120 may transmit a control signal to an electric motor for applying a torque to a steering shaft of the vehicle.

The torque sensor 10 measures a steering torque of a driver which is applied to the steering shaft of the vehicle, so as to generate a torque signal, and provides the torque signal to the determining unit 110. Accordingly, information on a steering angle can be provided to the determining unit 110.

A Yaw rate sensor 20 may be installed in the vehicle and detect a Yaw rate of a vehicle body in a driving of the vehicle to provide information on the Yaw rate to the determining unit 110.

The determining unit 110 may determine the turning state of the vehicle based on the information received from the torque sensor 10 and the Yaw rate sensor 20.

The above-mentioned determining unit 110 determines whether the vehicle drives on a curved road (turning path) with a predetermined curvature, in the determination of the turning state of the vehicle. The turning state of the vehicle may be generally classified into an under-steering, an over-steering, and a neutral-steering according to a cornering property of the vehicle depending on a relation of a handling of a steering wheel and a movement of the vehicle.

Particularly, the under-steering refers to a situation in which, when the vehicle turns at a desired steering angle and is sped up, a turning radius of the vehicle increases, and the over-steering refers to a situation in which the turning radius of the vehicle decreases. The neutral-steering refers to a situation in which there is no change of the turning radius of the vehicle.

Typically, in a case of the neutral-steering condition, there is no problem. Accordingly, the abnormal turning state as described above may be the under-steering state or the over-steering state. In a case of the abnormal turning state, the driver fails to steer the vehicle in a direction which the driver desires, so that the vehicle deviates from a predicted path and may cause an accident. Accordingly, the abnormal state is required to be improved.

Especially, when the road is covered with snow or dirt, it causes the tires to slip. When the driver suddenly steers the vehicle on a curved road, it makes a rear portion of the vehicle to slip toward an outside of the road, often resulting in the over-steering state. This is dangerous for the driver.

Therefore, the determining unit 110 determines the abnormal turning state, and performs a role of allowing the controller 120 to adjust a control signal for a control which hampers the alignment of the tires so that the tires of the vehicle may be aligned by steering.

In order to determine the turning state, the determining unit 110 compares the first Yaw rate value calculated by using the steering angle measured by the torque sensor 10 with a second Yaw rate value measured by the Yaw rate sensor 20, so as to determine the turning state of the vehicle.

At this time, considering the steering torque applied to the steering shaft by the driver, the first Yaw rate value means an ideal/a theoretical Yaw rate value applied to the vehicle when the vehicle moves along a normal path. In order to calculate the first Yaw rate value, the determining unit 110 may calculate the first Yaw rate value based on at least one of a longitudinal velocity of the vehicle, a mass of the vehicle, a cornering rigidity of a tire, a distance from a center of the vehicle to an axle of a front wheel, a distance from the center of the vehicle to an axle of a rear wheel, a lateral acceleration, and an inertia moment of a Yaw direction in addition to the steering angle measured by the torque sensor 10.

The calculation of the first Yaw rate value using the above-mentioned parameters will be described below with reference to FIG. 2.

Figure 2:
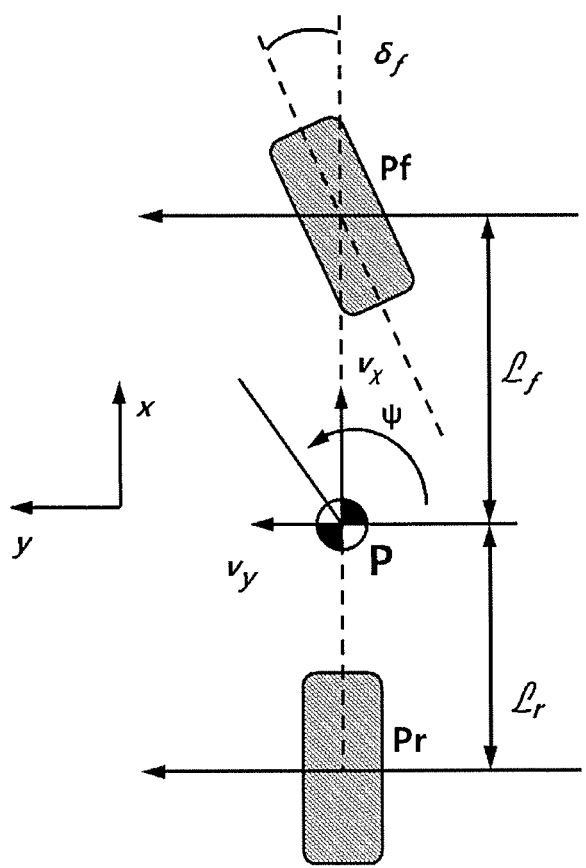
FIG. 2 is a view exemplarily illustrating a bicycle model which is simplified to calculate a theoretical value of a Yaw rate according to the embodiment of the present invention.

FIG. 2 is a view exemplarily illustrating a bicycle model which is simplified to calculate a theoretical value of a Yaw rate (The first Yaw rate value) according to the embodiment of the present invention.

For example, in a case of using the simplified bicycle model, in FIG. 2, $\delta_f$ indicates a steering angle $\delta$ or an angle (angle related to turning angle) corresponding to the steering angle $\delta$, $P_f$ indicates a center portion of a front wheel, $P_r$ indicates a center portion of a rear wheel, and P denotes the center of the gravity on a line extending between $P_f$ and $P_r$. Further, $L_f$ denotes a distance from the center Pf of the front wheel to the point P, i.e., a distance from the center of the vehicle to the axle of the front wheel, and $L_r$ indicates a distance from the center $P_r$ of the rear wheel to the point P, i.e., a distance from the center of the vehicle to the axle of the rear wheel.

In FIG. 2, when a direction of an x-axis (a direction of a line extending from $P_f$ to $P_r$) corresponds to a front direction of the vehicle, and a direction of a y-axis (a direction of a line extending from $P_f$ and $P_r$) corresponding to a lateral direction of the vehicle, $v_x$ denotes a velocity component of the x-axis of the vehicle, and $v_y$ indicates a velocity component of the y-axis of the vehicle. Accordingly, the velocity V of the vehicle may be obtained by the vector sum of $v_x$ and $v_y$.

Further, $\psi$ is a Yaw angle corresponding to the Yaw rate value in a case where the point P is a central axis in the over-steering state of the vehicle.

For example, the first Yaw rate value may be calculated from parameters including the steering angle of the vehicle measured by the torque sensor, the longitudinal velocity of the above-mentioned vehicle, the cornering rigidity of the tire, the distance from the center of the vehicle to the axle of the front wheel, and the distance from the center of the vehicle to the axle of the rear wheel by using Equation (1) below.

$$\begin{Bmatrix} \ddot{y} \\ \ddot{\psi} \end{Bmatrix} = \begin{bmatrix} -\dfrac{C_{ar} + C_{af}}{mv_x} & \dfrac{L_r C_{ar} - L_f C_{af}}{Mv_x} - v_x \\ \dfrac{L_r C_{ar} - L_f C_{af}}{I_z v_x} & -\dfrac{L_r^2 C_{ar} - L_f^2 C_{af}}{I_z v_x} \end{bmatrix} \begin{Bmatrix} \dot{y} \\ \dot{\psi} \end{Bmatrix} + \begin{bmatrix} \dfrac{C_{af}}{m} \\ \dfrac{C_{af} L_f}{I_z} \end{bmatrix} \delta_f \quad (1)$$

Ψ: Yaw angle
δ: steering angle
$V_x$: longitudinal velocity of vehicle
$L_f$: distance from center of vehicle to axle of front wheel
$L_r$: distance from center of vehicle to axle of rear wheel
$C_{af}$: cornering rigidity of front wheel
$C_{ar}$: cornering rigidity of rear wheel
$I_z$: moment of Yaw direction
m: mass of vehicle More particularly, because the distances $L_f$ and $L_r$ from the center of the vehicle to the axles of the front and rear wheels, the cornering rigidities $C_{af}$ and $C_{ar}$ of the front and rear wheels, the moment $I_z$ of the Yaw direction, and the mass m of the vehicle, which are constant, are known, a differential equation of a lateral acceleration and the Yaw rate of the vehicle to a time may be known based on information of the longitudinal velocity $v_x$ of the vehicle which is measured.

Further, if a Yaw rate value of an initial time may be known from the differential equation, a value of the Yaw rate, which varies according to time flow, may be calculated.

As described in the above example, the determining unit 110 compares the first Yaw rate value with a second Yaw rate value measured by the Yaw rate sensor 20 and determines the turning state of the vehicle, after the first Yaw rate value is calculated.

For example, if a difference between the first Yaw rate value calculated by the determining unit 110 and a second Yaw rate value of a real vehicle measured by the Yaw rate sensor 20 is within a predetermined reference value, it may be determined that the vehicle is in the normal turning state. If the difference between the first Yaw rate value and the second Yaw rate value of the real vehicle measured by the Yaw rate sensor 20 exceeds the predetermined reference value, it may be determined that the vehicle is in the abnormal turning state (the over-steering state or the under-steering state). Otherwise, if a difference between an estimated lateral acceleration value and a real lateral acceleration value exceeds a reference value, it may be determined that the vehicle deviates from the normal turning state and is in the over-steering state or the under-steering state.

The determination method will be described in detail. As a result of comparing the first Yaw rate value and the measured second Yaw rate value of the vehicle, if the measured second Yaw rate value is larger than the first Yaw rate value by the reference value, the determining unit 110 determines that the vehicle is in the over-steering state which is the abnormal turning state. If the measured second Yaw rate value is smaller than the first Yaw rate value by the reference value, the determining unit 110 determines that the vehicle is in the under-steering state which is the abnormal state.

When the determining unit 110 determines that the vehicle turns abnormally, the controller 120 performs a role of reducing a control signal which hampers a steering operation for the alignment of the tires in order to return the vehicle to the normal turning path, so that the driver easily steers the vehicle so as to enable the vehicle to turn normally through the alignment of the tires.

The alignment of the tires for the return to the normal turning will be described with reference to FIG. 3.

Figure 3:
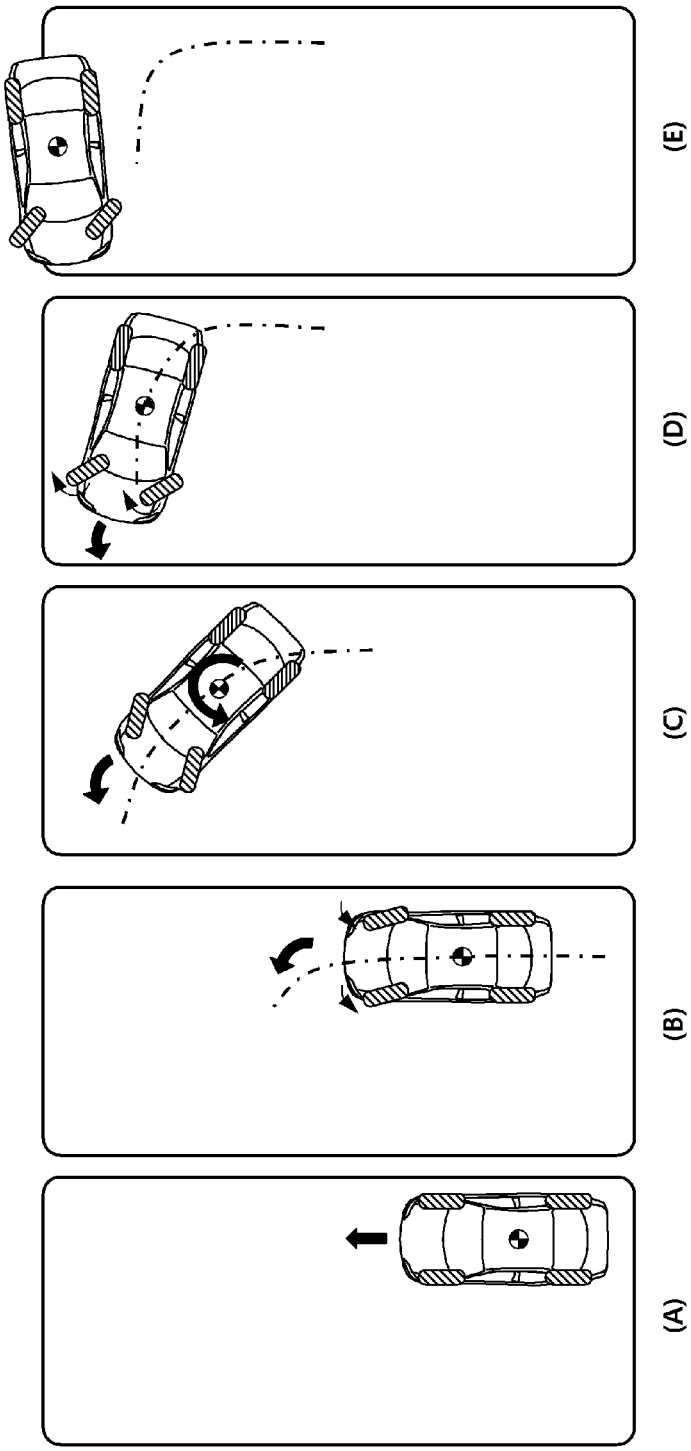
FIG. 3 is a view exemplarily illustrating a state of a vehicle before and after a steering control, according to the embodiment of the present invention.

FIG. 3 is a view exemplarily illustrating a state of a vehicle before and after a steering control, according to the embodiment of the present invention.

Referring to FIG. 3, for example, the vehicle turns normally as shown in FIG. 3(A). When the driver suddenly steers the vehicle on a curved road as shown in FIG. 3(B), the front wheels vary over a predetermined angle, and the rear wheels slip toward the outside of the curved road. A Yawing phenomenon may occur in the over-steering state as shown in FIG. 3(C).

In a case of the rear wheel-driving vehicle, or a case where the road is covered with snow or dirt, this phenomenon may often occur because the tires may easily slip. Accordingly, if the vehicle fails to return to the normal turning state, this phenomenon may endanger the driver and the vehicle.

In this case, if the determining unit 110 determines that the vehicle is in the over-steering state, the controller 120 may reduce a control amount for a control hampering the alignment of the tires in which the front wheels of the vehicle are steered in a direction in which the rear wheels slip, so that the vehicle returns to the normal turning state.

Similarly, if it is determined that the vehicle is in the under-steering state, the controller 120 may reduce a control amount for a control hampering the alignment of the tires in which the front tires of the vehicle are steered in an opposite direction in which the rear wheels slip.

More particularly, when the over-steering state occurs as shown in FIG. 3(C), the driver performs an operation of steering the front wheels so that the vehicle turns in a direction opposite to that of the over-steering in order to compensate for the over-steering. That is, in the over-steering state, in order to compensate for an amount of the over-steering, it is necessary to steer the front wheels in a direction in which the rear wheels slip so that the vehicle turns in a direction opposite to that of the curved road along which the vehicle is driven, i.e., the vehicle turns around the slipping direction of the rear wheels. However, in the under-steering state, in order to compensate for an amount of the under-steering, the front wheels are steered in a direction following the curved road along which the vehicle is driven, i.e., the vehicle turns around the direction opposite to the slipping direction of the rear wheels.

In a case of an EPS vehicle, the front wheels fail to be aligned in a direction of becoming the normal turning state because of an increase of friction of the steering apparatus, an effect of a control signal disturbing the steering of the driver, i.e., an effect of a damping control current, an effect of a returning control current, and the like, and the Yawing may be caused due to the over-steering or the under-steering.

However, according to the embodiment of the present invention, when the controller 120 performs an operation of reducing the control signal disturbing the alignment of the tires, the driver can easily steer the vehicle to change the alignment state of the tires as shown in FIG. 3(D). In result, the vehicle returns to the normal turning state by the steering operation of the driver as shown in FIG. 3(E).

The control signal disturbing the steering operation for the alignment of the tires described above disturbs the steering operation when the driver aligns the tires in the abnormal turning state, and there may be various control signals.

For example, the control signal includes the damping-control current signal or the returning-control current signal, and the controller 120 reduces a value of the current which is a control amount for the damping-control or the returning-control, thereby assisting the steering operation of the driver in the abnormal turning state.

The damping-control current mentioned above refers to a current for controlling to restrict a rapid movement of a gear, and the returning-control current refers to a current for controlling the tire to be aligned at the steering angle of 0 degrees. Therefore, when the rear-wheel driving vehicle is in the over-steering state, they function as control currents for disturbing the alignment of the front wheels in a direct in which the vehicle slips. Accordingly, the steering operation for the alignment of the tire can be easily performed in the abnormal turning state when a value of the damping-control current or the returning-control current is lowered.

Particularly, for example, if the determining unit 110 determines that the vehicle is in the abnormal turning state, the controller 120 may reduce the value of the current until the difference between the first Yaw rate value and the second Yaw rate value measured by the Yaw rate sensor 20 is lower than the predetermined reference value.

More particularly, for example, as a result of the determination of the determining unit 110 mentioned above, if it is determined that the vehicle deviates from the normal turning state and is in the over-steering state, the controller 120 reduces the damping-control current or the returning-control current by using a control signal for reducing at least one of the damping-control current and the returning-control current. Accordingly, the front wheels of the vehicle are steered and aligned in a direction in which the rear tires slip, thereby improving Yaw stability of the vehicle and returning the vehicle to the normal turning state.

Figure 4:
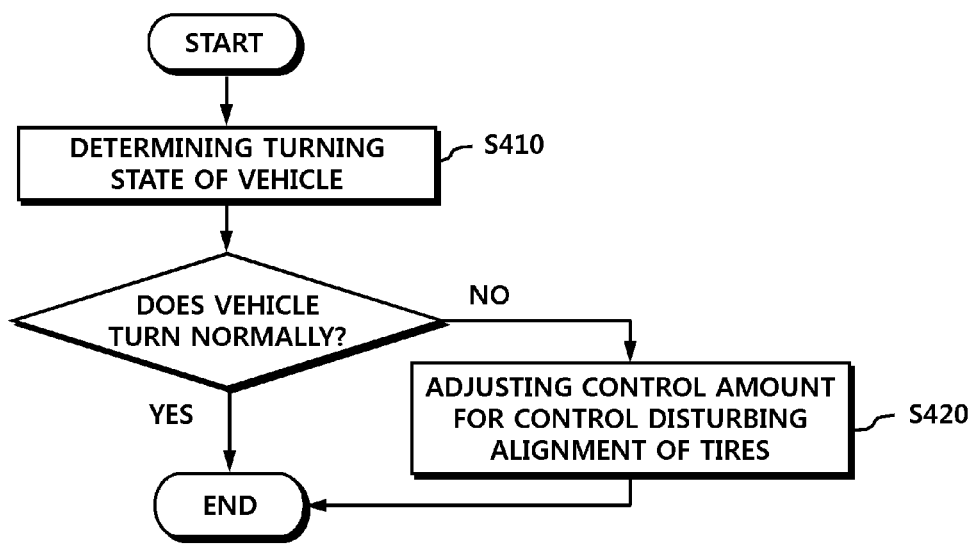
FIG. 4 is a flowchart illustrating a steering control method of the steering control apparatus according to the embodiment of the present invention.

FIG. 4 is a flowchart illustrating a process of controlling a steering in the steering control apparatus according to the embodiment of the present invention.

Referring to FIG. 4, the steering control method of the steering control apparatus 100 according to the embodiment of the present invention may include determining a turning state of a vehicle by calculating a first Yaw rate value based on a steering angle measured by the torque sensor 10 and comparing the first Yaw rate value with the second Yaw rate value measured by the Yaw rate sensor 20 (S410); and controlling a control amount for a control disturbing an alignment of the tires so that the vehicle may return to the normal turning state if it is determined that the vehicle is in an abnormal turning state (S420).

As described above, according to the present invention, the steering control apparatus 100 determines the turning state of the vehicle, and appropriately controls a steering control signal in order to allow the vehicle to maintain a normal turning state, thereby improving safety of the vehicle.

Even if it was described above that all of the components of an embodiment of the present invention are coupled as a single unit or coupled to be operated as a single unit, the present invention is not necessarily limited to such an embodiment. At least two elements of all structural elements may be selectively joined and operate without departing from the scope of the present invention. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

What is claimed is:

1. A steering control apparatus, comprising:
   a determining unit which calculates a first Yaw rate value based on a steering angle measured by a torque sensor and compares the first Yaw rate value with a second Yaw rate value measured by a Yaw rate sensor to determine a turning state of a vehicle according to a result of the comparison; and
   a controller configured to adjust a control amount for a control disturbing an alignment of tires to return the vehicle to a normal turning state if it is determined that the vehicle is in an abnormal state,
   wherein the control amount for the control disturbing the alignment of the tires is a value of an electric current for damping-control or returning-control, and
   the electric current is a damping-control current for restricting a rapid movement of a gear or a returning-control current for aligning the tires at the steering angle of 0 degree.

2. The steering control apparatus as claimed in claim 1, wherein the determining unit calculates the first Yaw rate value based on at least one of a longitudinal velocity of the vehicle, a mass of the vehicle, a cornering rigidity of a tire, a distance from a center of the vehicle to an axle of front wheels, a distance from a center of the vehicle to an axle of rear wheels, lateral acceleration, and an inertia moment of a Yaw direction.

3. The steering control apparatus as claimed in claim 1, wherein the determining unit determines that the vehicle is in an over-steering state which is an abnormal turning state, if the measured the second Yaw rate value is larger than the first Yaw rate value, as a result of the comparison.

4. The steering control apparatus as claimed in claim 3, wherein the controller reduces a control amount for a control disturbing an alignment of front wheels of the vehicle in a direction in which rear tires slip, in order to enable the vehicle to return to the normal turning state, if it is determined that the vehicle is in the over-steering state.

5. A steering control method, comprising:
   calculating, by a determining unit, a first Yaw rate value based on a steering angle measured by a torque sensor and comparing the first Yaw rate value with a second Yaw rate value measured by the Yaw rate sensor, so as to determine a turning state of a vehicle according to a result of the comparison; and
   adjusting, by a controller, a control amount for a control disturbing an alignment of tires to return the vehicle to a normal turning state if it is determined that the vehicle is in an abnormal state,
   wherein the control amount for the control disturbing the alignment of the tires is a value of an electric current for damping-control or returning-control, and
   the electric current is a damping-control current for restricting a rapid movement of a gear or a returning-control current for aligning the tires at the steering angle of 0 degree.

* * * * *